(12) United States Patent
Chou et al.

(10) Patent No.: US 6,394,066 B1
(45) Date of Patent: May 28, 2002

(54) CHARGE MOTION CONTROL VALVE

(75) Inventors: Tachih Chou, Ann Arbor; Oshin Avanessian, Livonia, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/614,071

(22) Filed: Jul. 11, 2000

(51) Int. Cl.[7] .................................................. F02B 31/06

(52) U.S. Cl. ...................................................... 123/308

(58) Field of Search ................................. 123/306, 308, 123/336, 337, 432, 590

(56) References Cited

U.S. PATENT DOCUMENTS

| 4,336,776 A | * | 6/1982 | Sumiyoshi et al. | ......... 123/306 |
|---|---|---|---|---|
| 5,359,972 A | | 11/1994 | Isaka | |
| 5,477,823 A | | 12/1995 | Uchida | |
| 5,640,941 A | | 6/1997 | Hazen et al. | |

* cited by examiner

*Primary Examiner*—Tony M. Argenbright
(74) *Attorney, Agent, or Firm*—Ford Global Tech., Inc.

(57) ABSTRACT

A charge motion control valve 10 for use in combination with an internal combustion engine having "Siamese" type fuel intake ports 18, 20. Valve 10 has an asymmetrical shape which provides for improved engine stability during cold start operating conditions by causing condensed fuel to be removed from intake valves and properly mixed and combusted within a cylinder of the engine.

16 Claims, 2 Drawing Sheets

CHARGE MOTION CONTROL VALVE

FIELD OF THE INVENTION

This invention relates to a charge motion control valve, and more particularly, to a charge motion control valve which is adapted for use within an internal combustion engine, and which provides for improved engine operation and stability during cold start operating conditions.

BACKGROUND OF THE INVENTION

Charge motion control valves ("CMCVs") are used within internal combustion engines in order to improve the flow of air and fuel into the engine's cylinders. A CMCV is typically and operatively disposed within an intake port of a vehicle engine "upstream" from a fuel injector. The CMCV is effective to alter the flow of air into the cylinder during certain vehicle operating modes (e.g., during relatively low engine speed and load conditions), and is effective to create turbulence within the cylinder, thereby improving combustion within the cylinder.

One type of CMCV is designed for use in combination with a "Siamese" type intake port which includes a main air intake port that splits or "branches" into a pair of separate ports that communicate with one of the engine's cylinders. This type of CMCV is typically and operatively disposed in relative close proximity to the location where the main intake port splits and is designed to alter the flow of air into each of the port branches. Some of these prior CMCVs, commonly referred to as "swirl" type CMCVs, are typically designed to substantially "cover" one side of the main air intake port, thereby preventing air from entering one of the branches. In this manner, the CMCV provides a "fuel rich" mixture within that branch that is subsequently discharged into the cylinder and combusted. Additionally, this type of CMCV covers only a portion of the other side of the main air intake port, effective to allow a substantial amount of air to flow into the other branch and to create a "fuel lean" mixture in that branch that is subsequently discharged into the cylinder and combusted along with the fuel rich mixture. This flow of air into the cylinder creates a swirling effect or turbulence which causes the fuel rich mixture and fuel lean mixture to combine and provide improved combustion. In this manner, the CMCV increases engine efficiency and decreases harmful emissions.

While these prior CMCVs provide the foregoing benefits, they suffer from some drawbacks which adversely effect the efficiency of the engine during certain operating conditions. For example and without limitation, during cold start operating conditions (i.e., when the vehicle is being started after being exposed to relatively cold temperatures), fuel often condenses on the intake valves due to a lack of heat. Because this type of prior CMCV substantially blocks air from flowing into one of the port branches, condensed fuel often remains on the intake valves within that branch and/or enters the cylinder as a liquid stream and is thus not properly combusted within the cylinder. This undesirably leads to oil degradation, waste fuel, and increased hydrocarbon emissions.

Another prior type of CMCV, commonly referred to as a "tumble" type CMCV, is used to create a "tumbling" flow of air into the cylinders. This type of CMCV provides substantially symmetrical passages for air to flow on each side of the valve. Hence, this type of CMCV provides a substantially similar air/fuel mixture and airflow within each branch port. While this type of CMCV substantially prevents condensation from remaining on the intake valves, it does not cause the desired swirling and mixing of the fuel and air provided by the "swirl"-type control valves, and therefore does not provide the concomitant fuel economy and emissions benefits.

There is therefore a need for a new and improved charge motion control valve which is adapted to provide improved mixing of air and fuel within a combustion cylinder during cold start conditions.

SUMMARY OF THE INVENTION

It is a first object of the invention to provide a charge motion control valve which overcomes at least some of the previously delineated drawbacks of prior charge motion control valves.

It is a second object of the invention to provide a charge motion control valve for use in combination with an internal combustion engine having "Siamese" type fuel intake ports.

It is a third object of the invention to provide a charge motion control valve which provides for improved engine stability during cold start operating conditions.

It is a fourth object of the invention to provide a charge motion control valve which is effective to cause condensed fuel to be removed from intake valves and to be properly mixed and combusted within a cylinder.

According to a first aspect of the present invention, a charge motion control valve is provided. The charge motion control valve is adapted for use within an engine of the type including an air intake port which branches into a first and a second intake port which communicate with a cylinder, and a fuel injector which injects fuel into the first and second intake ports. The charge motion control valve is operatively disposed in the air intake port in relative close proximity to the first and second intake ports and includes a first half which forms a first unrestricted area, effective to allow a first amount of air to enter into the first intake port, and a second half which forms a second unrestricted area which is smaller than the first unrestricted area and which is effective to allow a second amount of air to enter into the second intake port, the first and second amounts of air being effective to carry the fuel into the cylinder and to create turbulence within the cylinder.

According to a second aspect of the present invention, a method is provided for controlling the flow of air within an air intake port of the type including a primary port which branches into a first port containing a first amount of fuel and a second port containing a second amount of fuel, the first and second ports being selectively and fluidly connected to a cylinder. The method includes the steps of: directing a first amount of air into the first port, effective to substantially vaporize the first amount of fuel; directing a second amount of air into the second port, the second amount of air being greater than the first amount of air, and being effective to substantially vaporize the second amount of fuel and to cooperate with the first amount of air to create turbulence within the cylinder.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
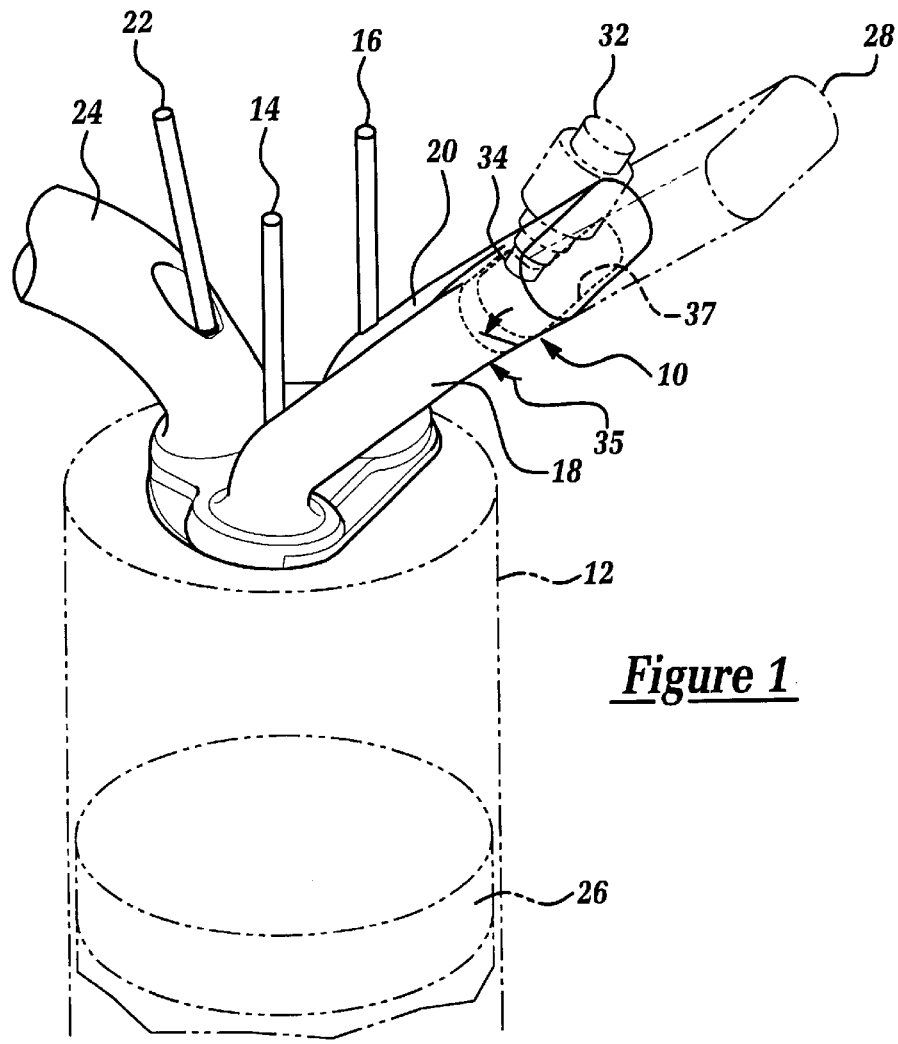
FIG. 1 is a perspective view of a cylinder of an internal combustion engine including a fuel intake port containing a charge motion control valve which is made in accordance with the teachings of a preferred embodiment of the present invention.
Figure 2:
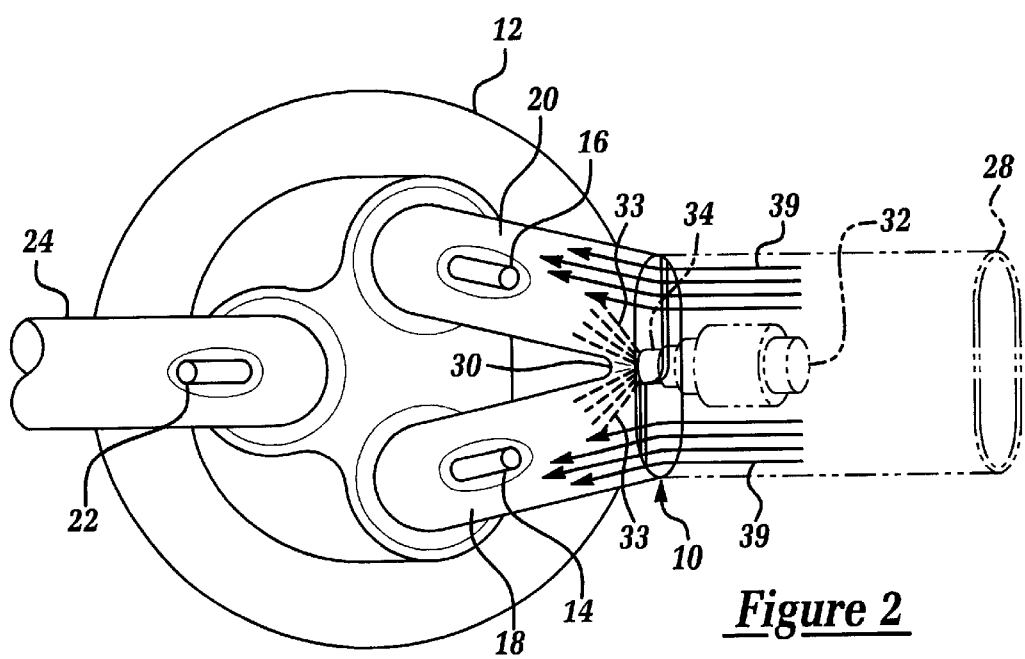
FIG. 2 is a top perspective view of the cylinder and charge motion control valve shown in FIG. 1.

Referring now to FIG. 1, there is shown a charge motion control valve 10 which is made in accordance with the teachings of the preferred embodiment of the invention and which is adapted for use in combination with an internal combustion engine of the type having at least one cylinder 12. Cylinder 12 includes a pair of intake valves 14, 16, which selectively and respectively allow intake ports 18, 20 to be fluidly connected to cylinder 12 and to deliver an air and fuel mixture to cylinder 12. Cylinder 12 further includes at least one exhaust valve 22 which selectively discharges exhaust gasses from the cylinder 12 through discharge port 24. Cylinder 12 further includes a conventional piston 26 which is slidably disposed within cylinder 12.

Intake ports 18 and 20 comprise "Siamese" type intake ports which are integrally and fluidly joined to a primary port 28 which splits or "branches" at point 30, thereby forming ports 18 and 20. A conventional fuel injector 32 is operatively disposed within port 28 and includes a conventional "split" spray nozzle 34 which is operatively disposed in relative close proximity to point 30 and which is effective to selectively spray a stream of atomized fuel 33 into port 18 and a stream of atomized fuel 33 into port 20.

Charge motion control valve ("CMCV") 10 is made from a relatively thin heat resistant material such as a metal material. CMCV 10 is operatively and pivotally disposed within port 28 in a conventional manner, and is effective to selectively restrict the flow of air 39 into ports 18 and 20. Particularly, valve 10 is selectively and pivotally movable in a conventional manner between a first or "closed" position (shown in FIG. 1) where valve 10 is disposed at an angle 35 with respect to the bottom surface 37 of port 28, thereby restricting airflow into ports 18 and 20; and a second or "open" position where valve 10 is substantially parallel with respect to the interior bottom surface 37 of port 28, thereby allowing air to travel freely or unrestricted into ports 18, 20. Valve 10 is selectively moved to its open position at relatively high engine speeds or loads to provide maximum airflow into cylinder 12. In the preferred embodiment, a portion of fuel injector 32 rests on valve 10 such that nozzle 34 extends past valve 10 and discharges fuel slightly "downstream" from valve 10. In other alternate embodiments, valve 10 is operatively disposed further upstream from nozzle 34. In one non-limiting embodiment, angle 35 is approximately 70 degrees.

Referring now to FIGS. 3a through 3h, there is shown various embodiments of CMCV 10. The dashed line 40 in FIGS. 3a–3h represents the interior surface of the intake port 28. Each valve 10 forms an "open", unrestricted, or flow area 42 in intake port 28 through which air may selectively flow, and a solid area which represents the solid portion or body of the valve 10 which prevents or blocks the flow of air through a portion of port 28. Each FIGS. 3a–3h further includes an axis 44 which separates or "divides" the port 28 into a first or left half 46 which communicates air primarily into port 20 and a second or right half 48 which communicates air primarily into port 18. Each valve 10 includes a curved portion or groove 50 in which a portion of the fuel injector assembly 32 resides.

Figure 3A:
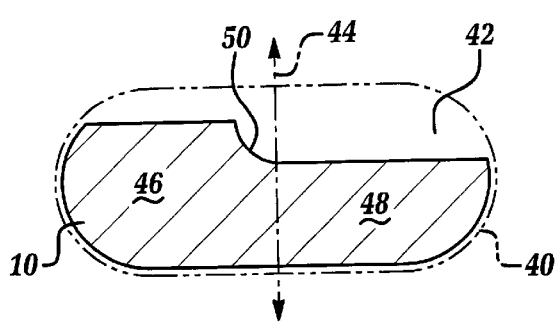
FIGS. 3a–3h illustrate various embodiments of the charge motion control valve illustrated in FIG. 1.
Figure 3B:
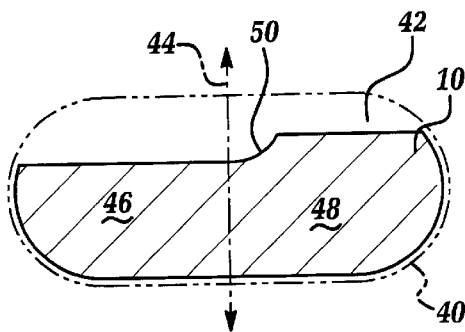
Figure 3C:
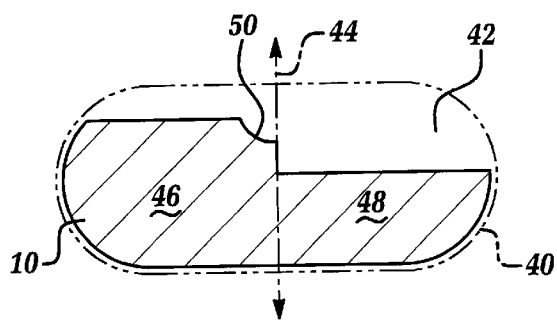
Figure 3D:
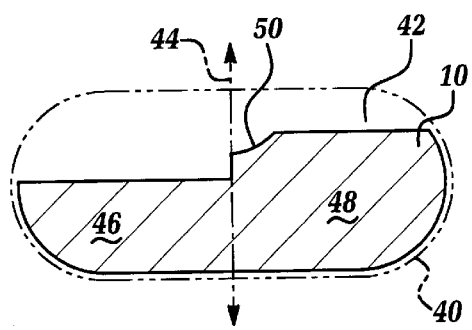
Figure 3E:
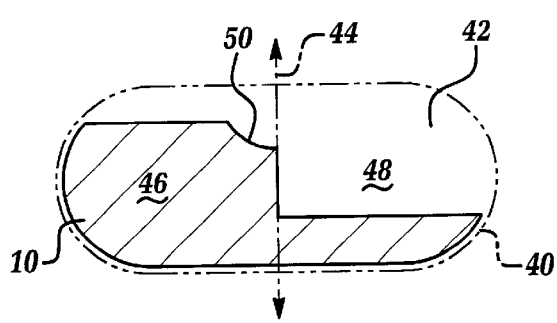
Figure 3F:
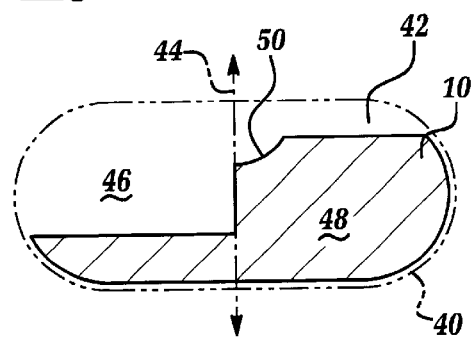
Figure 3G:
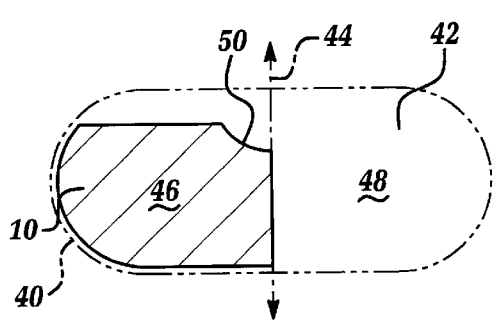
Figure 3H:
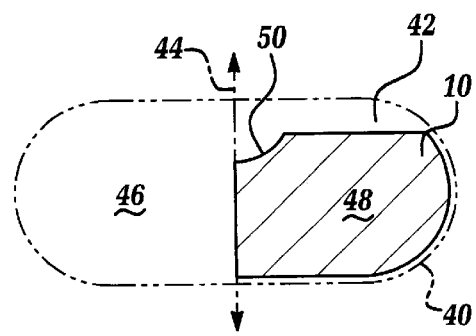

The embodiment of valve 10 shown in FIG. 3a includes a first half or portion which forms an unrestricted area 42 in the upper portion of half 46 of port 28 that is equal to about ten percent (10%) of the total cross-sectional area of port 28, and a second half or portion which forms an unrestricted area 42 in the upper portion of half 48 of port 28 that is equal to about twenty percent (20%) of the total cross-sectional area of port 28. The embodiment of valve 10 shown in FIG. 3b is the inverse or "mirror image" of the embodiment shown in FIG. 3a. The embodiment of valve 10 shown in FIG. 3c includes a first half or portion that forms an unrestricted area 42 in the upper portion of half 46 of port 28 that is equal to about ten percent (10%) of the total cross-sectional area of port 28, and a second half or portion that forms an unrestricted area 42 in the upper portion of half 48 of port 28 that is equal to about twenty-five percent (25%) of the total cross-sectional area of port 28. The embodiment of valve 10 shown in FIG. 3d is the inverse or "mirror image" of the embodiment shown in FIG. 3c. The embodiment of valve 10 shown in FIG. 3e includes a first half or portion that forms an unrestricted area 42 in the upper portion of half 46 of port 28 that is equal to about ten percent (10%) of the total cross-sectional area of port 28, and a second half or portion that forms an unrestricted area 42 in the upper portion of half 48 of port 28 that is equal to about forty percent (40%) of the total cross-sectional area of port 28. The embodiment of valve 10 shown in FIG. 3f is the inverse or "mirror image" of the embodiment shown in FIG. 3e. The embodiment of valve 10 shown in FIG. 3g includes a first half or portion that forms an unrestricted area 42 in the upper portion of half 46 of port 28 that is equal to about ten percent (10%) of the total cross-sectional area of port 28, and a second half or portion that forms an unrestricted area 42 which represented the entire half 48 of port 28 or fifty percent (50%) of the total cross-sectional area of port 28. The embodiment of valve 10 shown in FIG. 3h is the inverse or "mirror image" of the embodiment shown in FIG. 3a. It should be appreciated that the foregoing non-limiting embodiments of valve 10 in no way limit the design or construction of valve 10 and that numerous other designs and percentage values may be used in alternate embodiments of valve 10.

Importantly, the asymmetrical shape or configuration of each of valves 10 forms an uneven amount of unrestricted or "flow" area 42 in both halves 46, 48 of intake port 28. Because each of valves 10 forms at least a portion of unrestricted area 42 on each side 46, 48 of port 28, airflow is communicated to each port 18, 20. This flow of air into both ports 18, 20 substantially prevents condensed fuel from accumulating in ports 18, 20 (e.g., on the walls of ports 18, 20) and on valves 14, 16 during cold start conditions. The controlled airflow which is communicated to both sides 46, 48 of port 28 generates a substantial flow of air into both ports 18, 20, effective to shear fuel droplets off both intake valves 14, 16 and to substantially atomize the fuel as it enters into the combustion chamber.

Furthermore, the asymmetric design of the valves 10 continues to allow a significantly greater amount of air to enter one of the ports 18, 20, thereby allowing for a significant amount of swirl and tumble within cylinder 12. Particularly, the uneven shape of valves 10 causes a substantially greater amount of air to flow through the half of port 28 that has a larger unrestricted area 42. Hence, one of the ports 18, 20 (e.g., the port associated or aligned with the less "restricted" half of port 28) will receive this greater amount of air and will deliver a "fuel lean" mixture to cylinder 12. The other port will provide a more "fuel rich"

mixture, but will still have sufficient airflow to shear and/or vaporize condensed fuel off of the respective port walls and the respective intake valve located within the port. In this manner, valve 10 provides relatively strong charge motion which enhances the burn rate within the cylinders and the amount of fuel mixing. Additionally, valves 10 have been shown to provide significant swirl and tumble ratios.

It is to be understood that the invention is not to be limited to the exact construction and/or method which has been illustrated and discussed above, but that various changes and/or modifications may be made without departing from the spirit and the scope of the invention.

What is claimed is:

1. A charge motion control valve for use with an engine of the type including an air intake port which branches into first and second ports which communicate with a cylinder, a fuel injector which injects fuel into said first and second ports, said engine further comprising a first intake valve which is operatively disposed within said first port and a second intake valve which is operatively disposed within said second port, wherein an amount of fuel condenses on said first and second intake valves during cold start conditions, said charge motion control valve being operatively disposed in said air intake port in relative close proximity to said first and second ports and comprising a first half which forms a first unrestricted area, effective to allow a first amount of air to enter into said first port and a second half which forms a second unrestricted area which is larger than said first unrestricted area and which is effective to allow a second amount of air to enter into said second port, said first and second amounts of air being effective to carry said fuel into said cylinder and to create turbulence within said cylinder, and wherein said first and second amounts of air being further effective to shear said condensed fuel from said first and second intake valves, thereby substantially vaporizing said condensed fuel.

2. The charge motion control valve of claim 1 wherein said first and second unrestricted areas are located in an upper portion of said air intake port.

3. The charge motion control valve of claim 2 wherein said air intake port has a certain cross-sectional area and wherein said first unrestricted area comprises approximately ten percent of said certain cross-sectional area, and said second unrestricted area comprises approximately twenty percent of said certain cross-sectional area.

4. The charge motion control valve of claim 2 wherein said air intake port has a certain cross-sectional area and wherein said first unrestricted area comprises approximately ten percent of said certain cross-sectional area, and said second unrestricted area comprises approximately twenty-five percent of said certain cross-sectional area.

5. The charge motion control valve of claim 2 wherein said air intake port has a certain cross-sectional area and wherein said first unrestricted area comprises approximately ten percent of said certain cross-sectional area, and said second unrestricted area comprises approximately forty percent of said certain cross-sectional area.

6. The charge motion control valve of claim 2 wherein said air intake port has a certain cross-sectional area and wherein said first unrestricted area comprises approximately ten percent of said certain cross-sectional area, and said second unrestricted area comprises approximately fifty percent of said certain cross-sectional area.

7. The charge motion control valve of claim 2 wherein said valve is selectively and pivotally movable between a first position in which said valve forms said first and second unrestricted areas, and a second position in which said valve permits air to flow substantially unrestricted into said first and second ports.

8. A charge motion control valve for use with an engine of the type including a primary air intake port which is fluidly connected to a first port and a second port, wherein an amount of fuel condenses within said first and second ports, said valve comprising:
a first portion which forms a first unrestricted area in a first half of said primary air intake port, effective to allow a first amount of air to flow into said first port; and
a second portion which is smaller than said first portion and which forms a second unrestricted area in a second half of said primary air intake port, thereby allowing a second amount of air to flow into said second port, said second amount of air being greater than said first amount of air, and wherein said first and second amounts of air are effective to substantially vaporize said amount of fuel.

9. The charge motion control valve of claim 8 wherein said engine includes a fuel injector having a nozzle which is disposed within said primary air intake port and which selectively discharges fuel into said first and second ports, said charge motion control valve being operatively disposed within said primary air intake port upstream from said nozzle, and being effective to create a fuel rich mixture within said first port and a fuel lean mixture within said second port.

10. The charge motion control valve of claim 9 wherein said first half and said second half of said air intake port respectively comprise a left half and a right half of said primary air intake port.

11. The charge motion control valve of claim 9 wherein said first port and said second port are each fluidly connected to a cylinder, and wherein said charge motion control valve is effective to create a turbulence within said cylinder, thereby improving combustion of said fuel.

12. The charge motion control valve of claim 11 wherein said first and second unrestricted areas are located in an upper portion of said primary air intake port.

13. The charge motion control valve of claim 12 wherein said air intake port has a certain cross-sectional area, and wherein said first unrestricted area comprises at least ten percent of said certain cross-sectional area, and wherein said second unrestricted area comprises at least twenty percent of said certain cross-sectional area.

14. A method for controlling the flow of air within an air intake port of the type including a primary port which branches into a first port containing a first amount of fuel and a second port containing a second amount of fuel, said first and second ports being selectively and fluidly connected to a cylinder, said method comprising the steps of:
directing a first amount of air into said first port, effective to substantially vaporize said first amount of fuel;
directing a second amount of air into said second port, said second amount of air being greater than said first amount of air, and being effective to substantially vaporize said second amount of fuel and to cooperate with said first amount of air to create turbulence within said cylinder.

15. The method of claim 14 further comprising the step of:
providing an asymmetrical charge motion control valve; and
operatively disposing said asymmetrical charge motion control valve within said primary port effective to direct said first and second amounts of air into said first and second ports, respectively.

16. The method of claim 15 wherein said primary port has a certain cross-sectional area, and wherein said asymmetrical charge motion control valve is effective to form a first unrestricted area within said primary port which comprises at least ten percent of said certain cross-sectional area, and to form a second unrestricted area within said primary port which comprises at least twenty percent of said certain cross-sectional area.

* * * * *